United States Patent
Cheng et al.

(10) Patent No.: US 8,192,285 B2
(45) Date of Patent: Jun. 5, 2012

(54) METHOD AND APPARATUS FOR SIMULATING GAMES INVOLVING A BALL

(75) Inventors: Howard Cheng, Sammamish, WA (US); Shinji Yamamoto, Kyoto (JP); Daisuke Kumazaki, Kyoto (JP); Masahiko Nishimura, Kyoto (JP); Junji Takamoto, Kyoto (JP)

(73) Assignee: Nintendo Co., Ltd, Kyoto (JP)

(*) Notice: Subject to any disclaimer, the term of this patent is extended or adjusted under 35 U.S.C. 154(b) by 647 days.

(21) Appl. No.: 12/367,565

(22) Filed: Feb. 9, 2009

(65) Prior Publication Data

US 2009/0209346 A1    Aug. 20, 2009

Related U.S. Application Data

(60) Provisional application No. 61/027,527, filed on Feb. 11, 2008.

(51) Int. Cl.
*A63F 9/24* (2006.01)
(52) U.S. Cl. ............. 463/37; 463/39; 463/47; 273/148 B
(58) Field of Classification Search .................. 463/2–5, 463/37, 48–49; 273/148 R, 148 B
See application file for complete search history.

(56) References Cited

U.S. PATENT DOCUMENTS

| | | | |
|---|---|---|---|
| 6,811,491 B1 * | 11/2004 | Levenberg et al. | 463/47 |
| 2007/0178967 A1 | 8/2007 | Rosenberg | |
| 2008/0015017 A1 | 1/2008 | Ashida | |
| 2010/0113153 A1 * | 5/2010 | Yen et al. | 463/37 |

FOREIGN PATENT DOCUMENTS

GB    2 440 510 A    6/2008

OTHER PUBLICATIONS

Wikipedia, "Wii Remote," retrieved from the Internet: URL: http://en.wikipedia.org/w/index.php?title=Wii_Remote&oldid=190155105> (Feb. 9, 2008).
Extended European search report from counterpart EP application 09 001 788.0 (Jul. 22, 2009).

* cited by examiner

*Primary Examiner* — Dmitry Suhol
*Assistant Examiner* — Alex F. R. P. Rada, II
(74) *Attorney, Agent, or Firm* — Nixon & Vanderhye P.C.

(57) ABSTRACT

A sports video game having a new and improved user interface that substantially increases the potential realism of the game uses a handheld controller that is able to sense its own position, orientation and/or motion and is affixed to a ball. The ball can be a model of a football that is provided with a depression that snugly accepts and retains the handheld controller. The handheld controller may sense motion, position and/or orientation of the ball and provide wireless inputs to a video game system. The video game system may process such inputs to provide a simulated sports action game play on a video display.

6 Claims, 14 Drawing Sheets

METHOD AND APPARATUS FOR SIMULATING GAMES INVOLVING A BALL

CROSS-REFERENCES TO RELATED APPLICATIONS

This application claims the benefit of priority from provisional application No. 61/027,527 filed Feb. 11, 2008, the contents of which are incorporated herein by reference.

STATEMENT REGARDING FEDERALLY SPONSORED RESEARCH OR DEVELOPMENT

1. Field

The technology herein relates to video game play, and more particularly to a video game played using a projectile such as a ball. Still more particularly, the technology herein relates to systems, methods, techniques and stored programs that provide a video game having, in an illustrative implementation, sports game aspects, wherein a football is moved between competing player sides, and to realistic user input devices that simulate ball handling.

2. Background and Summary

Many of us are passionate or even fanatical about the sports we love. College stadiums and field houses literally rumble with the combined enthusiasm of thousands of spectators cheering on their teams. Professional team sports capture the hearts and imaginations of entire cities and regions. Wearing a certain hat or logo not only marks you as being from a great city such as Seattle, N.Y., Washington D.C., Boston or Osaka—it also marks you as having allegiance to the team you root for. Sports bars invest lots of money annually to provide the best possible equipment and environment for watching sports. Satellite, cable and broadcast networks devote vast resources to sports coverage. Sports scores and standings occupy significant portions of daily and weekly newspapers throughout the world.

Because we love our sports, sports based video games have also been very successful. Some of the very first video games were sports based (e.g., tennis or hockey). Sports based video games allow game players to competitively play a wide variety of sports from the comfort of their living rooms, dens and college dorms. Many sports video games are released every year, each with unique features and aspects designed to draw game players' attention and provide new and interesting game play. Players can play as their favorite Pro-Bowl quarterback or All-Star basketball player, even if they have never competitively played football or basketball.

Sports video game developers face the challenge of how to introduce new and exciting features in new sports games that may otherwise be similar to predecessor games in fundamental game play aspects. For example, the game playing public generally expects a football video game to provide a reasonably accurate model of at least some aspects of the actual game of football. Most game players will expect a football video game to be played on a field 100 yards long marked off in 10-yard increments, with two opposing teams each having 11 players. High realism is in high demand.

One past limitation to sports video game play relates to the input user interface. In a real football game, a quarterback throws a football downfield to a receiver, laterals the ball to a ball carrier, or carries the ball downfield himself. In a typical football video game, the game player controls play action using joysticks, cross switches, push buttons, and other typical game controller type controls. While such games have achieved high success, further improvements are desirable. Just as we never tire of the next baseball, football or soccer season, the video game playing community looks forward to release of yet another generation of sports video games. There is therefore a high premium on satisfying the demand for new, ever more exciting, interesting and realistic sports video game play.

Exemplary non-limiting illustrative implementations of the technology herein provide a sports video game having a new and improved user interface that substantially increases the potential realism and interest of the game.

In one exemplary illustrative non-limiting implementation, a handheld controller that is able to sense its own position, orientation and/or motion is affixed to a ball. In one exemplary illustrative non-limiting implementation, the ball can be an accessory that comprises a model of a football that is provided with a depression which snugly accepts and retains the handheld controller. The handheld controller may sense motion, position and/or orientation of the ball model and provide inputs wirelessly or via wires to a video game system. The video game system may process such inputs to provide a simulated sports action game play on a video display.

In exemplary illustrative implementations, the handheld controller may further include controls operated by fingers or thumbs of the game player. The ball model may further include a handle such as a strap to allow a game player to "throw" the ball without actually releasing it.

Further exemplary illustrative non-limiting features and advantages include:

- Use 3-axis accelerometer or other sensor(s) inside controller to determine distance and angular direction on the football field of a quarterback's pass, and running back's dodge motion, speed, and direction.
- Second Accelerometer or other sensor (for example, inside Nunchuk) can be added to pair with the controller accelerometer or other sensor to assist in sensing orientation. This improves the ability to recognize the intended actions.
- Low cost gyroscope (MEMS type) maybe added to sense orientation and improve the ability to recognize the intended actions.
- Screen position sensing capability such as the Wii remote pointing device capabilities can be utilized to assist direction choice.
- Physical hardware: Controller inserted into the side of the football, optionally include a second controller (e.g., Nunchuk) inserted into the side of the football, optionally include I2C attached Gyroscope inserted inside foam football or otherwise coupled to football.
- Football: Can be foam, sponge or plastic material with a slot to insert Wii Remote into; can include pocket/sleeve to tuck fingers under to prevent football from launching from hand during throwing motion; can include a cutaway window to expose Wii Remote buttons; optional cut out slot to insert the Wii Nunchuk can be provided
- Wii remote orientation: Wii remote is placed in reverse direction between a right handed and left handed person. This enables correct access to the Wii remote buttons during throwing motion, and keeping infrared sensor (DPD) aiming at TV screen.
- Controller buttons can be accessed for example by (a) fingers through/under the tuck sleeve on the hand holding the football (generally, buttons 1 and 2 on the Wii remote can be easily reached by the index finger; other buttons such as home button or A button can be reached by middle/ring/or little fingers may depend on the complexity of control provided by the game and likely the size of player's hand.

The hand not holding the football can easily reach all of the controls on the Wii remote. This may be used at the beginning of the playing action to control various play parameters (for example, the type of play).

In response to throwing motion, the system may determine intended target of the throw by sensing force and pitch of throw to determine flight arc distance, and sensing horizontal angle of throw to determine side to side (field) location To determine running action, the system may sense body shifting left and right to dodge would be tacklers, sense body jumping motion to jump over tacklers, sense arm (one holding football) swing to determine running speed and increasing/decreasing speed, and/or sense upper body bouncing up and down to determine running speed as the player jogs standing still to mimic running motion.

In example pass plays, the player may select plays and parameters by Wii Remote button/cross pad through the cutaway window on the football using either hand, hold the ball in horizontal position similar to position to receive the ball from the Center. This indicates the reference position to the inertial sensors. The player then proceeds to hike the ball. In some instances, it may be desirable to use Wii Remote DPD to select the area of the playing field to throw to. At the desired time, the player may cock the football back and throw with desired velocity, pitch and yaw to the receivers running route patterns on the television. By detecting the pitch angle and the force of the throw, arc trajectory of the throw can be determined to specify the intended distance to simulate in a football shown being passed downfield in the display.

By detecting the side-to-side motion during the throwing motion, it is possible to determine the yaw angle of the throw. Additionally, Wii remote IR sensor (DPD) can be used to indicate the target area of the throw. Anytime during this sequence, the fingers on the hand holding the football can push the buttons on the Wii remote to suggest changes or decisions to the game.

For an exemplary running play, the player select plays and parameters by operating the Wii Remote button/cross pad through the cutaway window on the football; holds the ball in horizontal position similar to position to receive the ball from the Center (this indicates the reference position to the inertial sensors); and proceeds to hike the ball, the game may choose constant running speed and/or speed maybe enhanced or determined by detecting the player's rate of a standing jog or arm swing rate of the football, and/or sense player's side to side shifting motion as an indication of running direction change and/or dodge tacklers, and/or sense player's upward motion as an indication to jump over tacklers.

Optional Nunchuk stick can be used during throwing motion to indicate quarterback mobility, receive selection and route or other function.

Player may be required to train the system with example throws. For example, throwing left, right, far and near once or several times may train the game software on this player's particular motion. The training data can then be used to more accurately detect a particular player's intended motion.

BRIEF DESCRIPTION OF THE DRAWINGS

These and other features and advantages will be better and more completely understood by referring to the following detailed description of exemplary non-limiting illustrative implementations in conjunction with the drawings of which.

DETAILED DESCRIPTION

Figure 1:
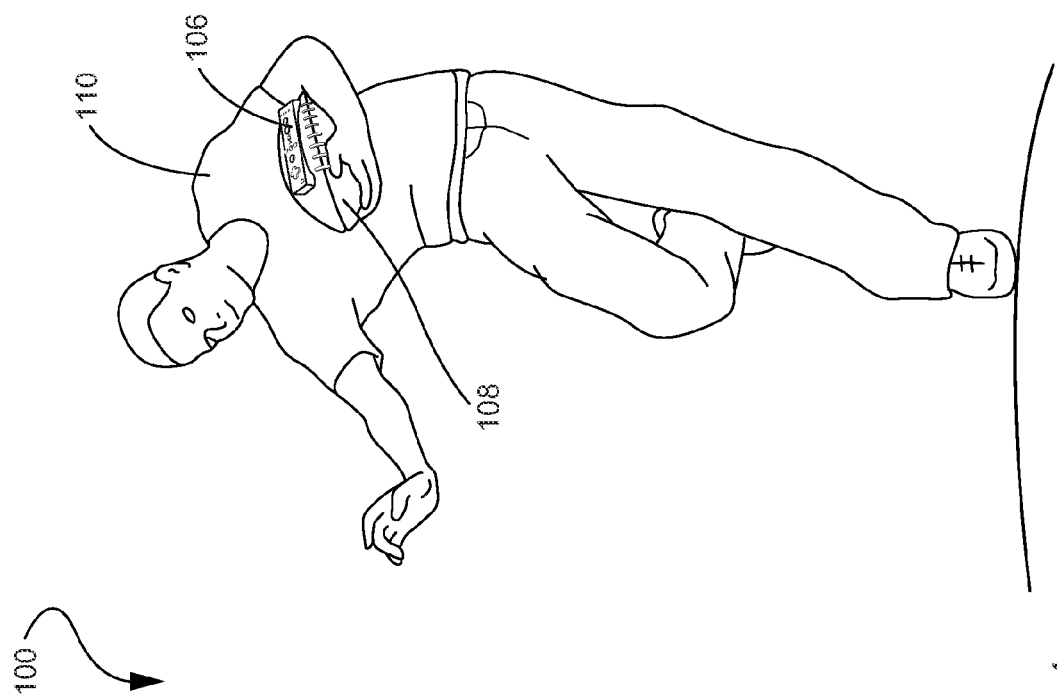
FIG. 1 shows an exemplary illustrative non-limiting game play system.
Figure 1:
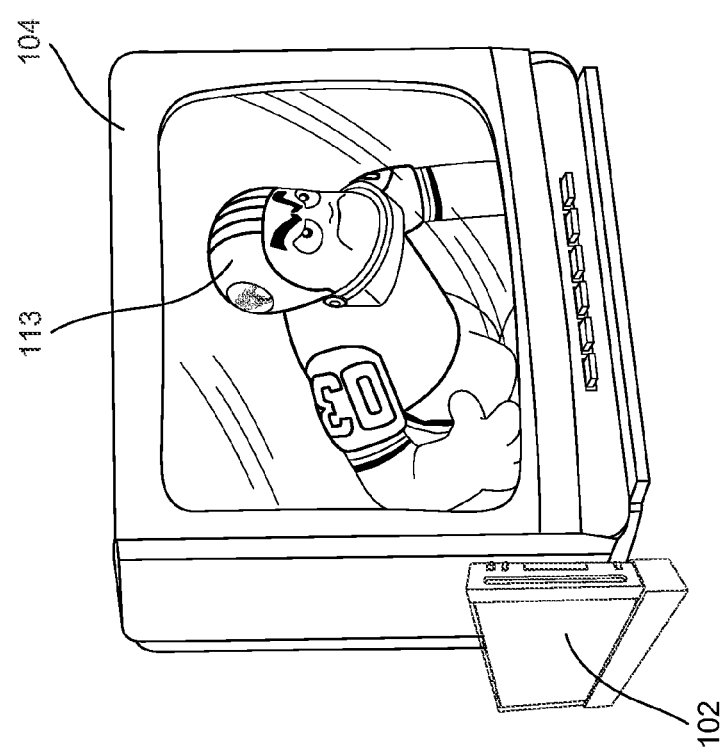
Figure 2A:
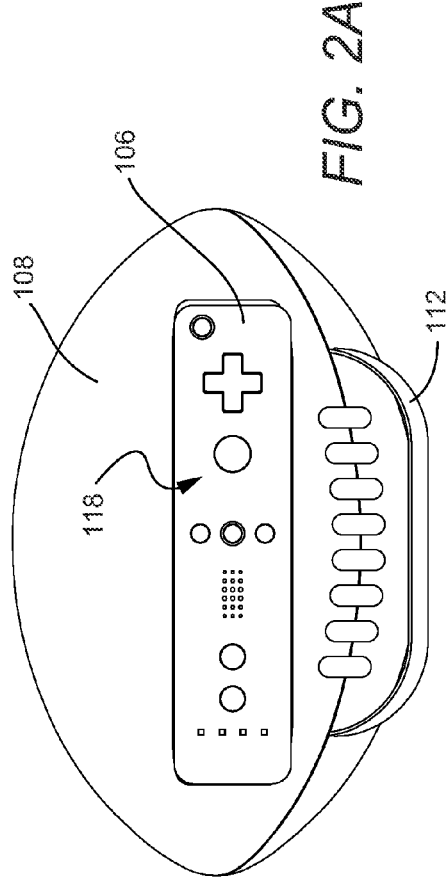
FIGS. 2A-2C show an exemplary illustrative non-limiting implementation of a football accessory including a depression snugly retaining a handheld controller that can sense its own position, orientation and/or motion.
Figure 2C:
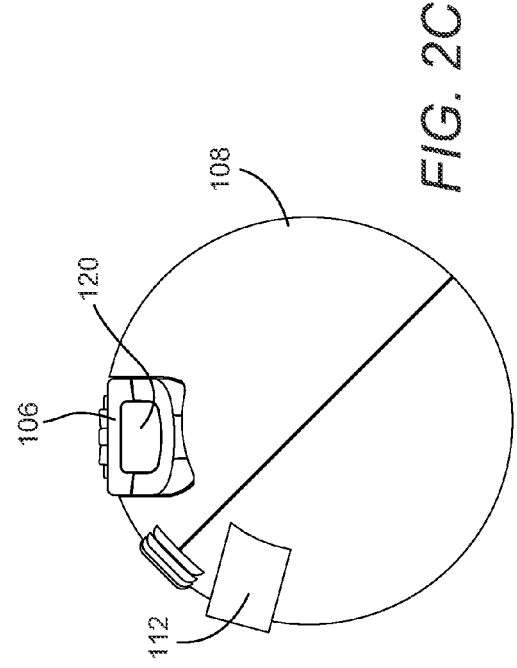
Figure 2B:
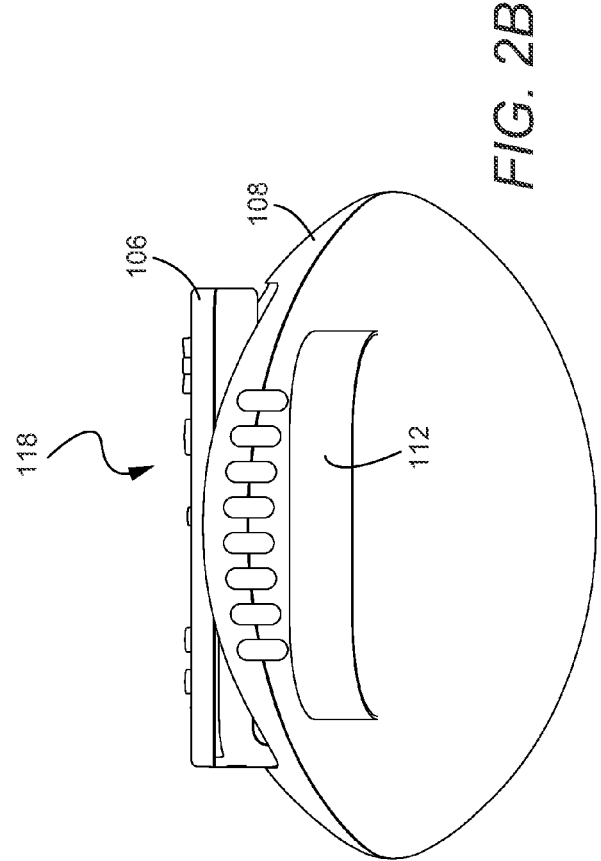

FIG. 1 shows an exemplary illustrative non-limiting video game playing system 100 that can be used to simulated a sports game such as American football. In the exemplary illustrative non-limiting implementation shown, a video game player 102 such as for example a prior art Nintendo Wii video game system produces an audiovisual output on a television 104 or other display device. The video game player 102 communicates wirelessly with a normally handheld controller 106 such as a Nintendo Wii Remote.

In the example show, the controller 106 is snugly retained within what appears to be a football 108. The football 108 is the example shown is not an actual football, but rather is a model of a football that includes a depression that snugly accepts and retains controller 106. Football 108 can be brown, have the shape and size of a regulation or other (e.g., youth) football, have a pigskin texture like that of a real football, and include laces (actual or simulated) just like a real football.

The video game player 110 is able to hold football 108 and carry or throw it as if it were an actual football. The controller 106 snugly retained within the football 108 senses the position, orientation and/or motion of the football and sends corresponding signals back to the video game player 102. In response to such signals, the video game player 102 displays a responsive audiovisual display of a football game on display device 104.

For example, FIG. 1 shows an animated defensive linebacker 113 displayed on display 104. The video game player 110 carrying football 108 can bob and weave in order to avoid being tackled by the linebacker 113. In this particular non-limiting example system, a 3-axis accelerometer inside the controller 106 determines distance and angular direction on the football field of a quarterback's pass, and running back's dodge motion, speed, and direction. The video game player 102 receives signals from controller 106 indicative of the motion of football 108, and can control animated defensive linebacker 113 to respond and follow the ball to attempt to tackle the game player 110.

Figure 3A:
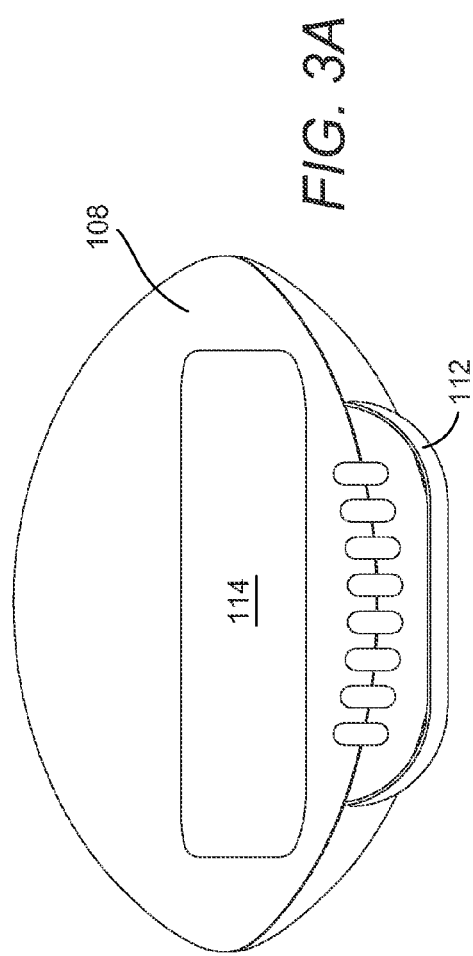
FIGS. 3A-3C show the FIG. 2A-2C exemplary illustrative non-limiting football accessory implementation without the exemplary illustrative non-limiting handheld controller inserted therein.
Figure 3C:
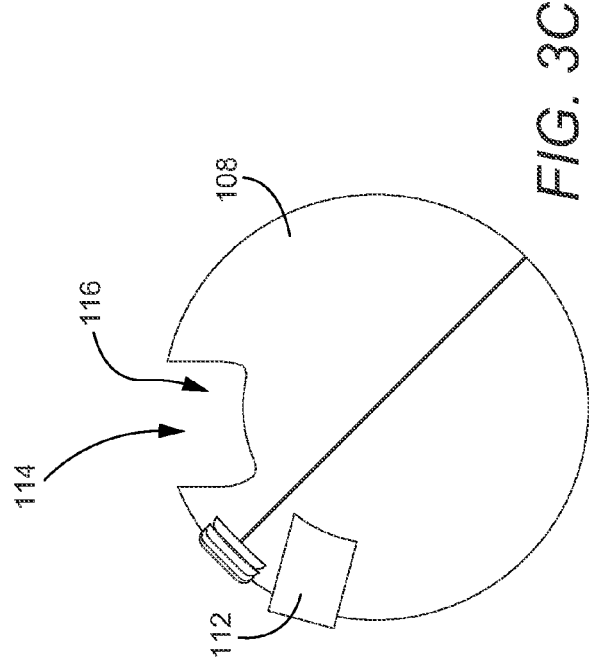
Figure 3B:
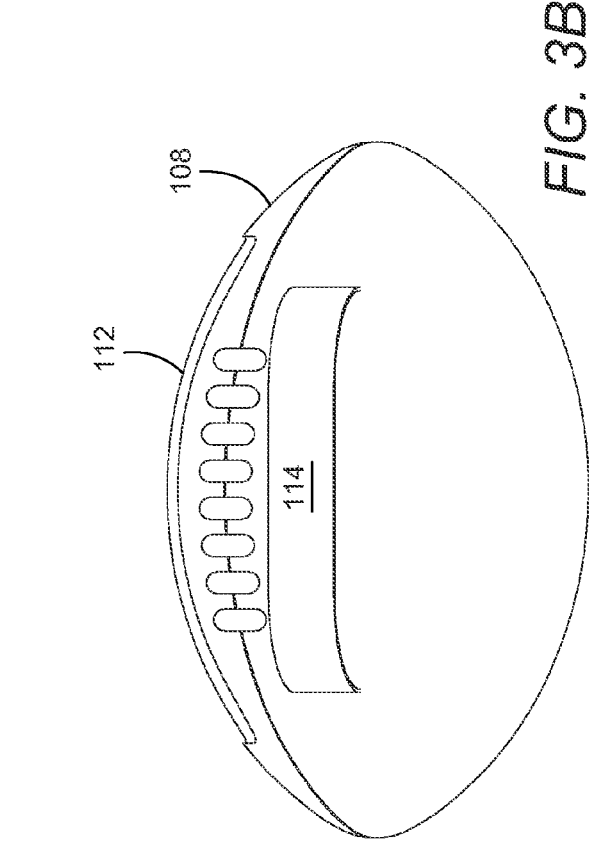

FIGS. 2A-2C and 3A-3C show exemplary illustrative non-limiting implementations of football 108. Football 108 can be made out of any desired material such as foam, sponge, plastic, leather etc. As can be seen in FIGS. 3A-3B, football 108 includes a longitudinally rectangular slot 114 to insert controller 106 into. Slot 114 is preferably dimensioned to snugly accept and retain controller 106 therein but allow the controller to be easily removed when desired. The slot 114 may include a cutaway window 116 that exposes buttons or other controls on controller 106 for manipulation by the player's hand. Football 108 may further include a pocket, sleeve or strap 112 that the game player 110 may tuck his or her fingers under or into to prevent football from actually launching from the hand during a throwing motion.

The exemplary illustrative non-limiting implementation permits the controller 106 to be placed in various orientations relative to football 108 to accommodate left-handed and right-handed players 110. This enables correct access to a control surface 118 including buttons or other manipulatable controls during throwing motion. In addition, the football 108 may allow a digital IR camera 120 at the nose of controller 106 to be aimed at display 104 so that it may detect infrared emitters mounted on or near the display and thereby sense its own orientation. Such sensed orientation (which also indicates the orientation of the football 108) may be transmitted back to the video game system 102 for processing to assist in determining intended direction of a pass.

Figure 4A:
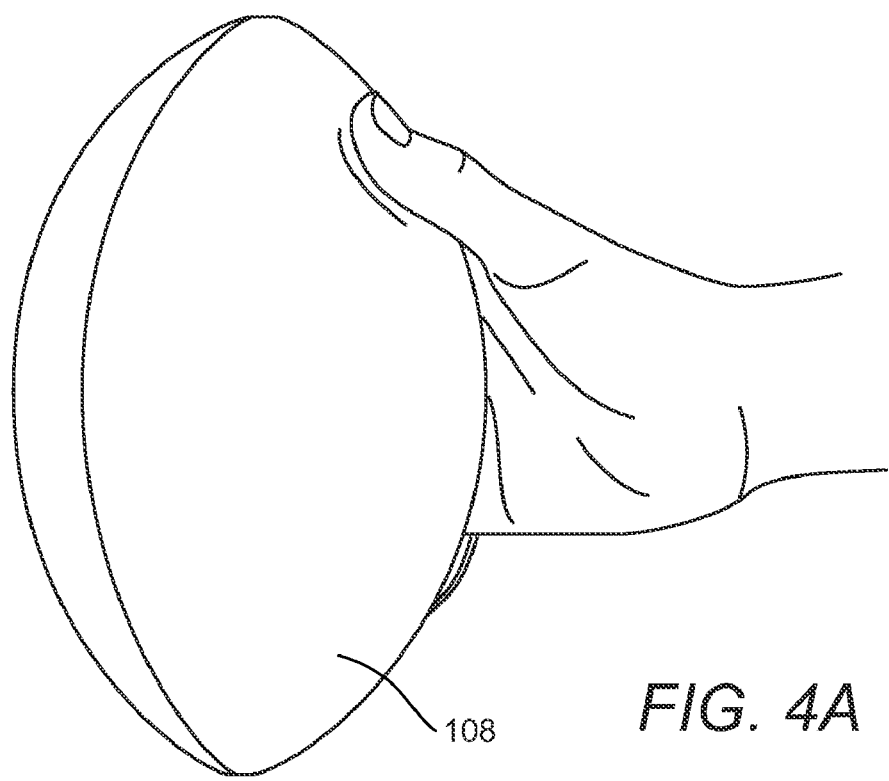
FIGS. 4A-4E show exemplary illustrative non-limiting ways for a game player to grasp the FIG. 2A-2C football accessory and manipulate controls on the exemplary illustrative non-limiting handheld controller.
Figure 4B:
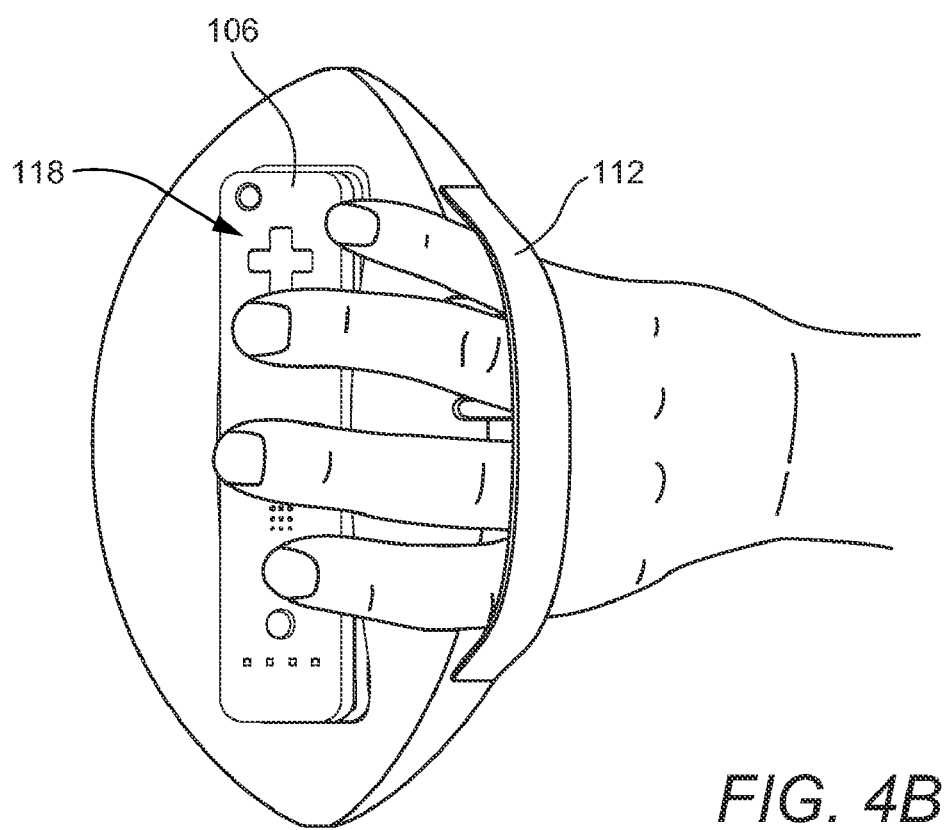
Figure 4C:
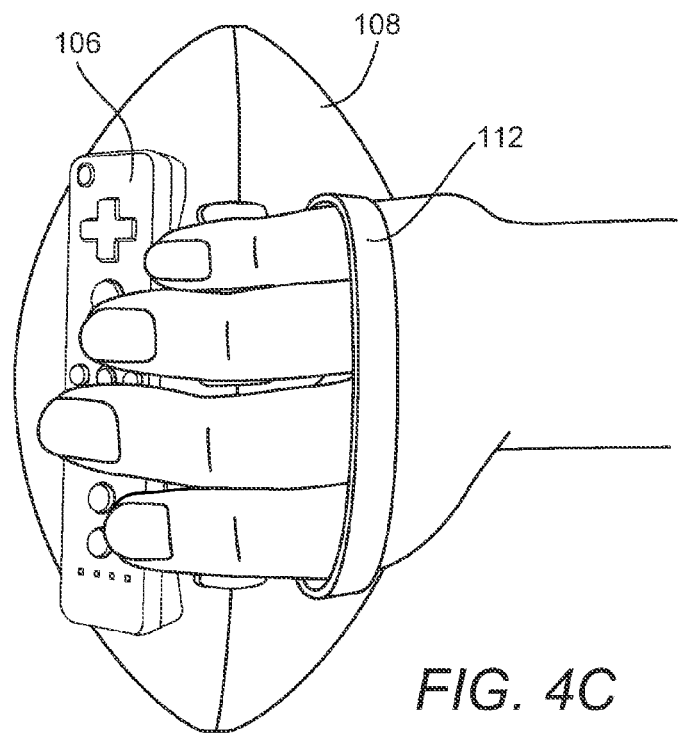
Figure 4D:
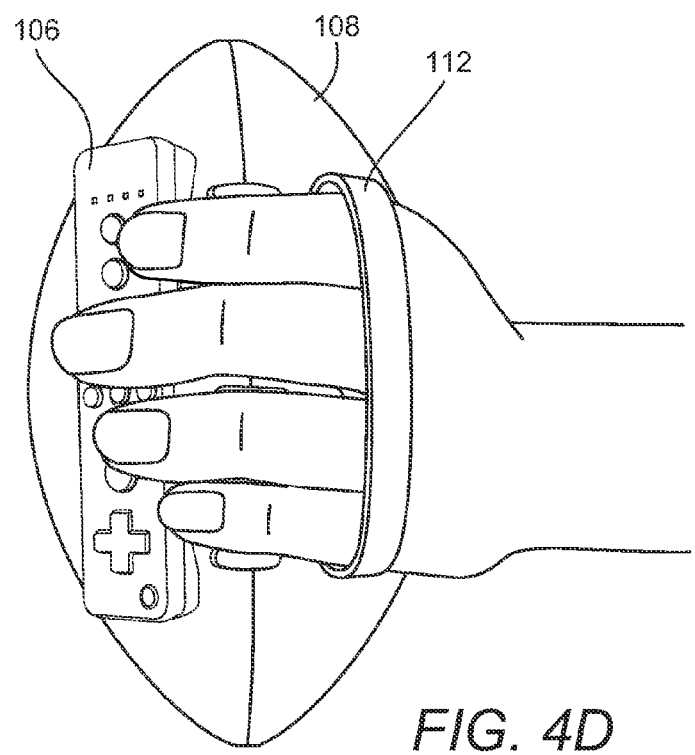

FIGS. 4A and 4B show one way a game player 110 may grasp football 108. As shown in FIG. 4B, the player 110 may access the buttons on controller 106 by for example placing his or her fingers through/under the tuck sleeve 112 on the hand holding the football. In such a position, various buttons (e.g., buttons 1 and 2) can be easily reached by the index finger. Other buttons such as a home button or A button can be reached by middle/ring/or little finger. The reach of various buttons may in some cases depend on the complexity of control provided by the game and perhaps the size of player's hand. FIGS. 4C and 4D show different orientations for remote 106 relative to football 108 and the player's hand to accommodate both left-handed and right-handed players.

Figure 4E:
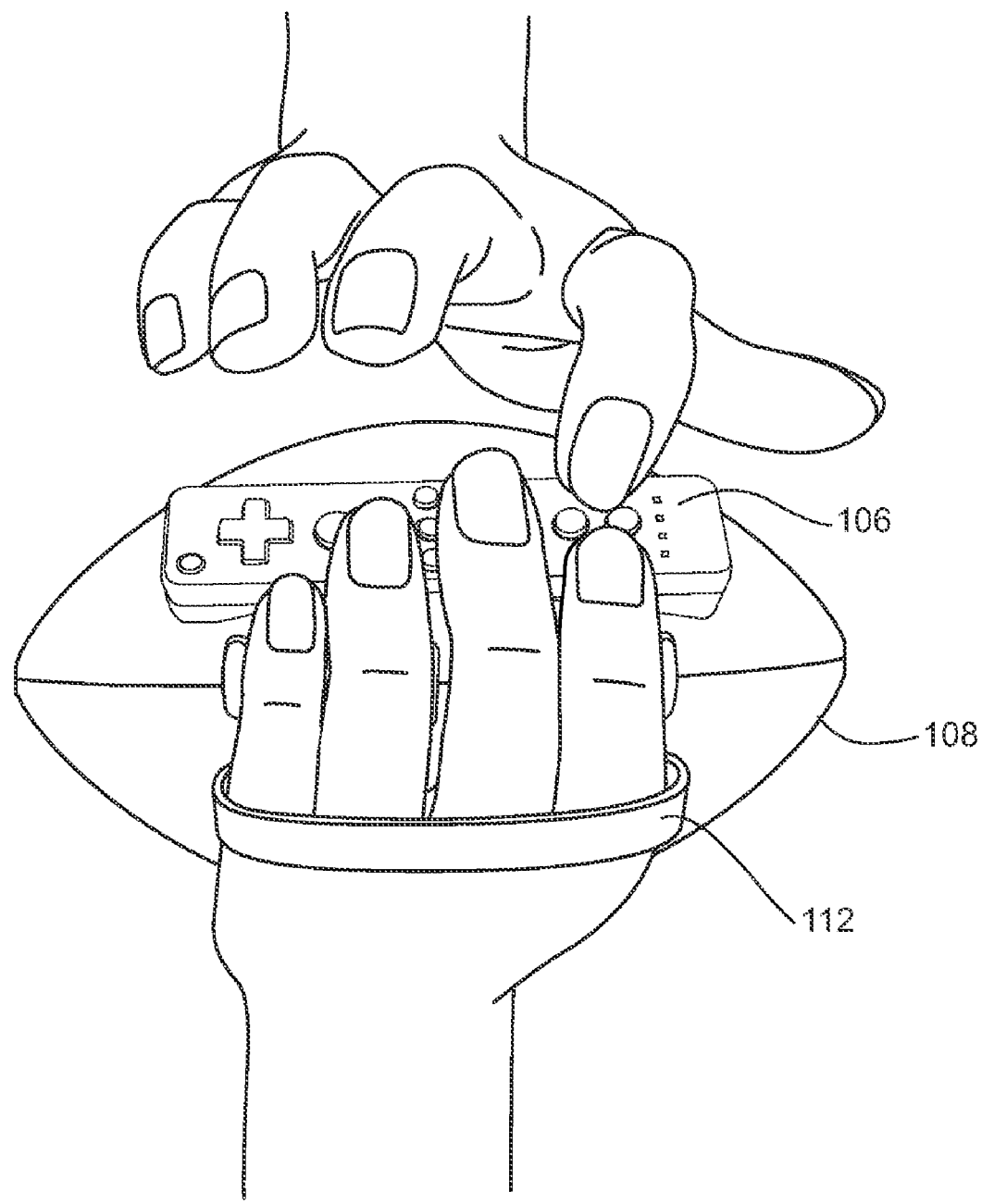

The hand not holding the football can easily reach all of the controls (see FIG. 4E). This maybe used at the beginning of the playing action to control various play parameters (for example, type of play).

Exemplary Illustrative Non-Limiting Throwing Motion Examples

Figure 5A:
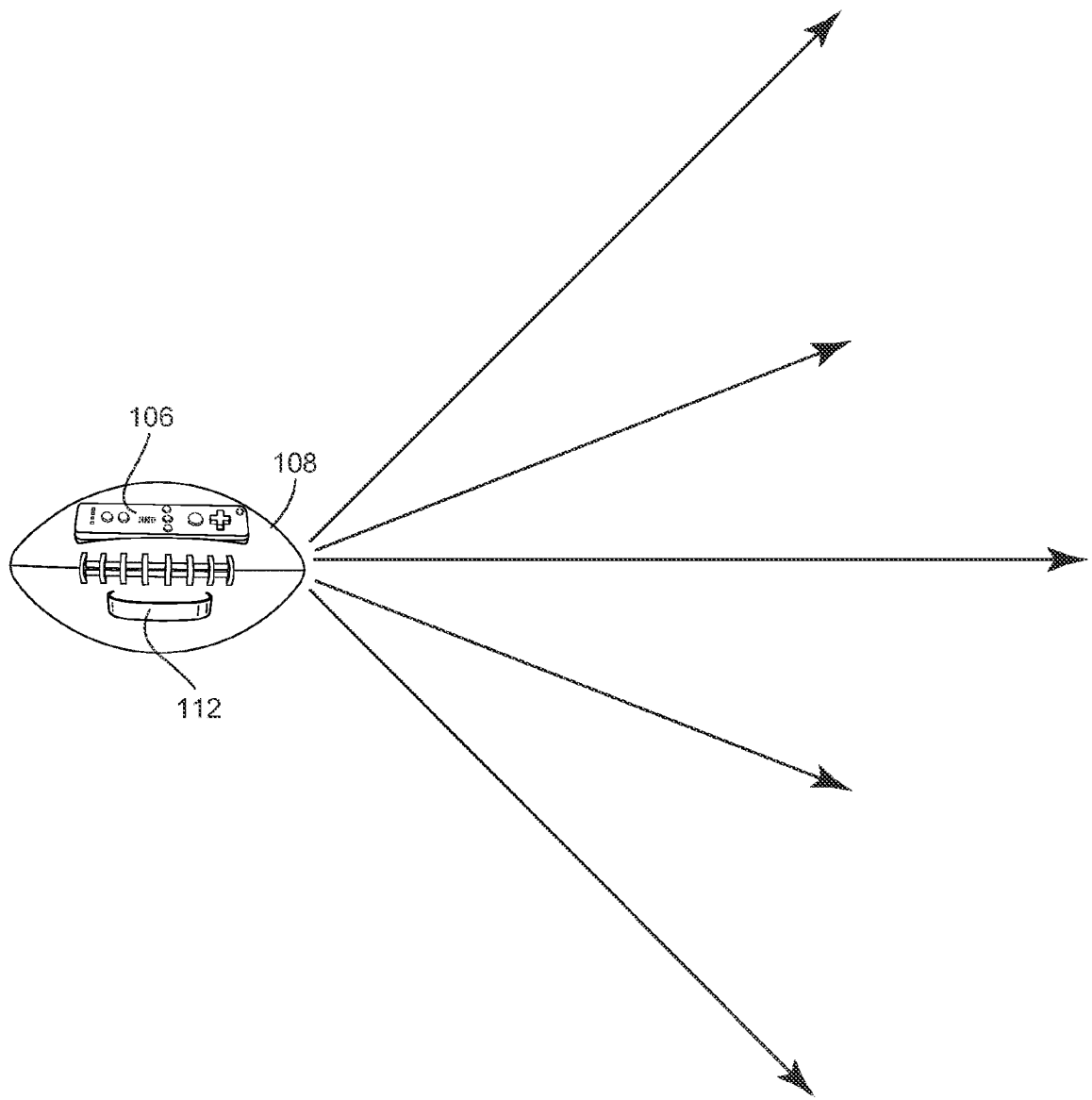
FIG. 5A-5B show exemplary motion directions and patterns for the FIG. 2A-2C exemplary illustrative non-limiting input device.
Figure 5B:
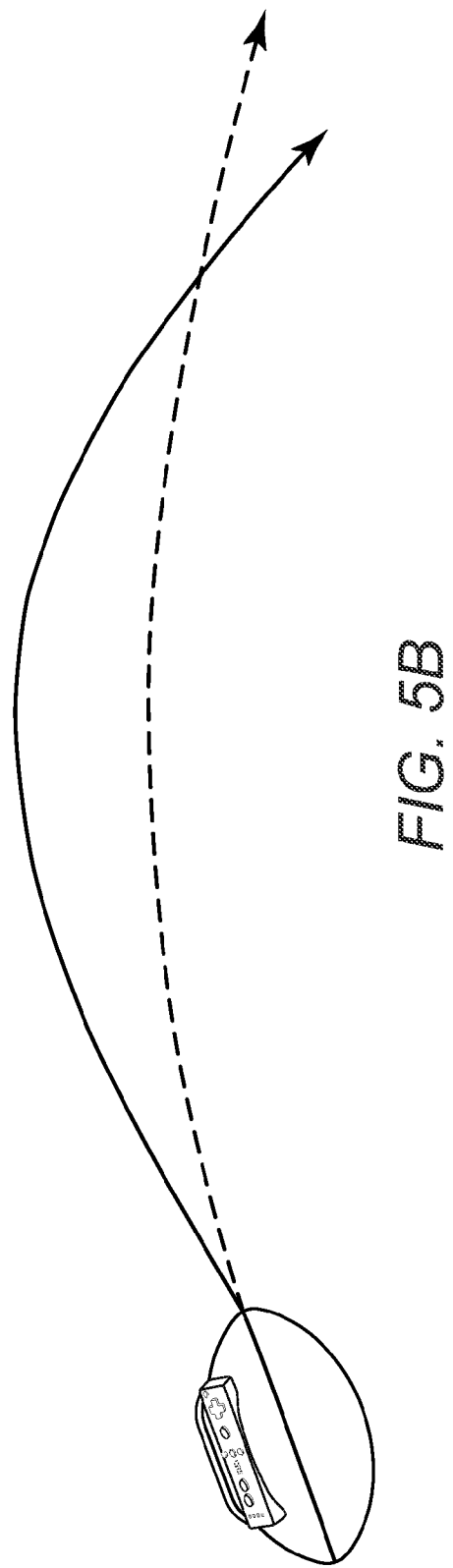

FIGS. 5A and 5B show two different example throwing motion scenarios. FIG. 5A illustrates directionality, and FIG. 5B illustrates different elevations. In the exemplary illustrative non-limiting implementation, football 108 is not actually thrown (the electronics of controller 106 could be damaged) but rather strap 112 retains the football in the player's hand after a "throw" but nevertheless allows the player to make all the motions of an actual throw. In the exemplary illustrative non-limiting implementation, a throwing motion is processed by determining the intended target of the throw, sensing force and pitch of throw to determine flight arc distance (FIG. 5B), and sensing horizontal angle of throw to determine side to side (field) location (FIG. 5A).

Exemplary Illustrative Non-Limiting Running Motion Examples

In American football, a quarterback has the option of either passing (throwing) the ball or running with the ball. Similarly, once a receiver catches the ball, he can run with the ball toward the goal line. The exemplary illustrative non-limiting implementation determines running action by sensing the body of player 110 shifting left and right to dodge would be tacklers. It is also possible to sense body jumping motion to jump over tacklers; sense arm (one holding football) swing to determine running speed and increasing/decreasing speed; and/or sense the upper body bouncing up and down to determine running speed as the player jogs standing still to mimic running motion.

Figure 6B:
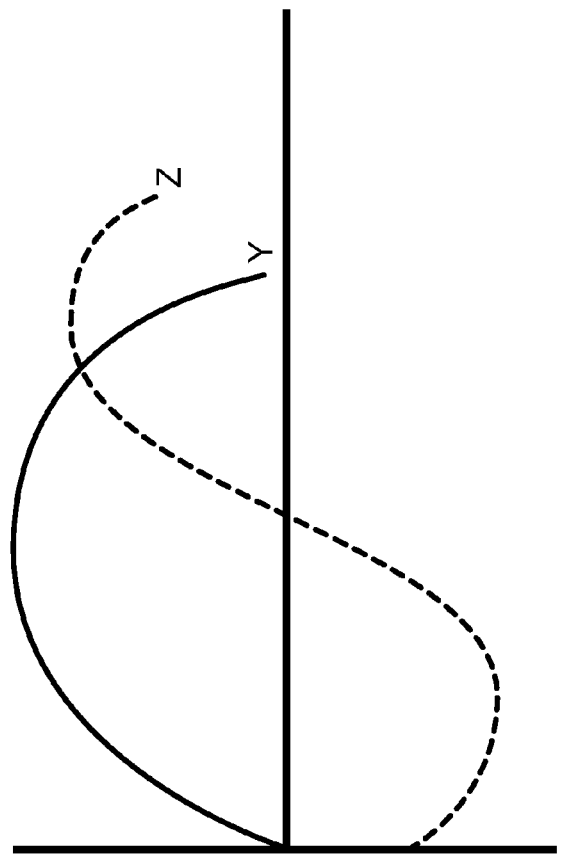
FIG. 6B show exemplary illustrative non-limiting accelerometer sensing outputs.
Figure 6A:
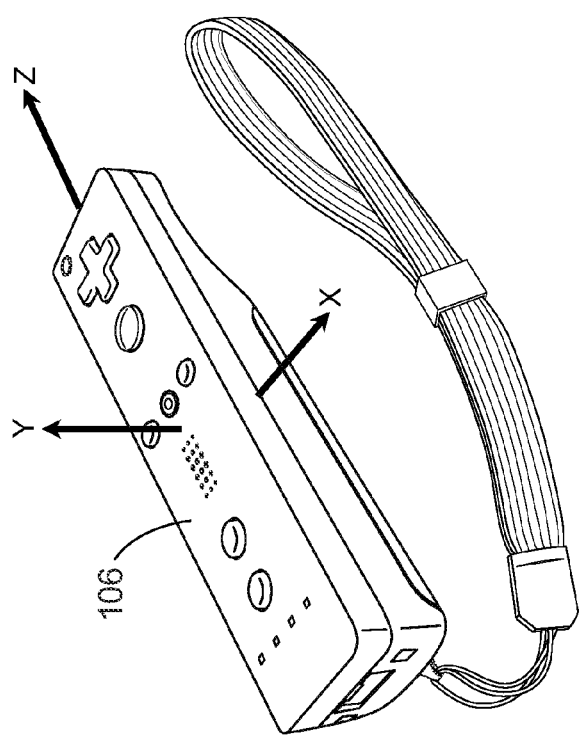
FIG. 6A shows exemplary motion reference directions.

FIG. 6A shows example X, Y and Z reference motion directions. The exemplary illustrative non-limiting controller 106 shown includes a 3-axis accelerometer that can be interpreted for example to orient the X, Y and Z axes as shown. Assume an example of throwing football 108 to illustrate how to recognize motion outputs from the 3-axes accelerometer as shown in FIG. 6B. In the standard overhand football throw motion, the controller 106 is moved from hike, to wind up, to the throw, and then to the follow-through. The quarterback should orient the positive Z axis forwards during the throw toward the display 104. In some exemplary illustrative implementations, it may be desirable to orient the y axis directly upwards vertically. FIG. 6B illustrates accelerometer output curve segments for what the football throw motion would look like. Actual outputs may of course differ from those shown in the graph depending for example on force, direction, trajectory, wind-up, etc. For simplicity of explanation, the X axis will be ignored for the moment since when throwing a football similar relationships exist between the Y and Z axes.

During the throw segment, there is noticeable forward acceleration then deceleration along the Z axis, which results in a fall, then a rise, then a fall in the Z curve (imagine how a car passenger's head would rock back, forwards then back during acceleration followed by braking). Along similar timing with the "start" and "end" of the Z curve shown, the acceleration along the Y axis would increase then decrease because human arm motion swings the football in an arc. The Y axis accounts for centripetal acceleration during the elliptical overhead throwing motion.

In recognizing the motion of football 108, a processing algorithm can search for the following behaviors in the accelerometer curve segments:

Z will fall then rise then fall

Y should rise then fall

Z and Y motions should start and end around the same time

The absolute value of the Z and Y curves are not as important as the rise and fall relationships.

Minimum slope and/or magnitude of curve segments can be used to reject unintended throws.

Exemplary Illustrative Non-Limiting Processing Steps

Figure 7:
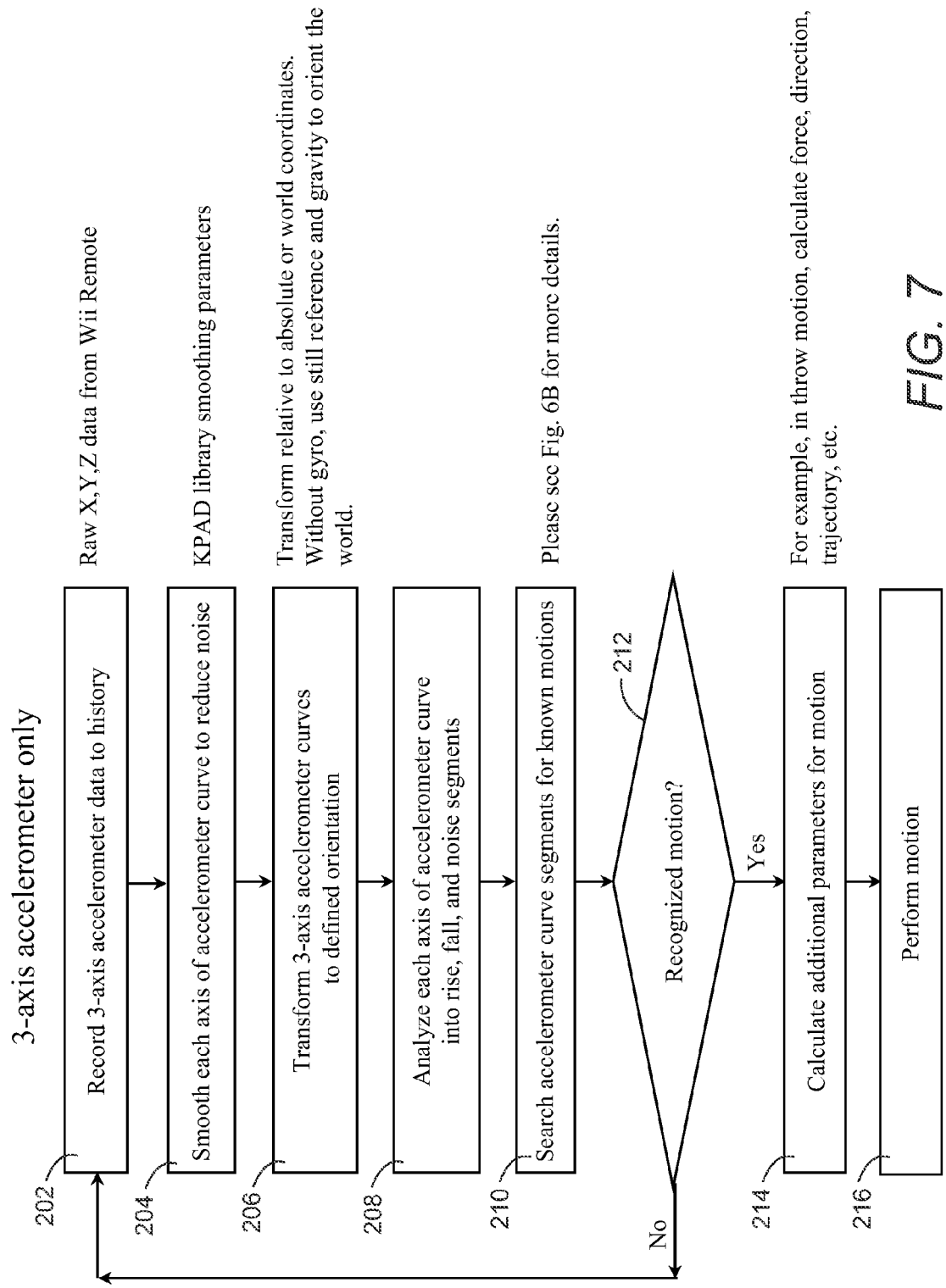
FIG. 7 shows an exemplary illustrative non-limiting flowchart of steps performed under software control.

FIG. 7 shows an exemplary illustrative non-limiting processing flowchart of program control steps performed by video game system 102 under software control. The example shown makes use of the above observations. The 3-axis acceleration data is recorded (block 202) and smoothed to reduce noise (block 204). The 3-axis acceleration curves are then transformed to a defined orientation (block 206) and analyzed to determine rise, fall and noise segments (block 208). The resulting curve segments are searched for known motions (block 210) as described above in connection with FIG. 6B. If motions are not recognized ("no" output to decision box 212), then the steps described above are repeated. If motions are recognized ("yes" output to decision box 212), then additional parameters (e.g., force, direction, trajectory, etc.) are calculated for motion (block 214) and the video game play performs the motion (e.g., by showing a ball being thrown downfield with the calculated direction and trajectory) (block 216).

Exemplary Illustrative Non-Limiting Example Pass Play Sequence

Player select plays and parameters by Wii Remote 106 button/cross pad through the cutaway window on the football 108 using either hand.

Hold the ball 108 in horizontal position similar to position to receive the ball from the Center. This indicate the reference position to the inertial sensors.

Proceed to hike the ball

Optional: Use Wii Remote DPD (digital camera 120) to select the area of the playing field to throw to.

At the desired time, cock the football 108 back and throw with desired velocity, pitch and yaw to the receivers running route patterns on the television 104.

By detecting the pitch angle and the force of the throw, determine arc trajectory of the throw. This detects the intended distance.

By detecting the side to side motion during the throwing motion, determine the yaw angle of the throw. Additionally, Wii remote DPD 120 can be used to indicate the target area of the throw.

At anytime during this sequence, the fingers on the hand holding the football 108 can push the buttons on the controller 106 to suggest changes or decisions to the game.

Simulate animated play action on the display 104 e.g., by showing a receiver catching or missing an animated football shown on the display traveling through the air downfield on a virtual football field as the crown roars.

Exemplary Illustrative Non-Limiting Running Play Examples

Player selects plays and parameters by controller 106 button/cross pad through the cutaway window on the football 108.

Hold the ball 108 in horizontal position similar to position to receive the ball from the Center. This indicate the reference position to the inertial sensors.

Proceed to hike the ball.

Game may choose constant running speed and/or speed maybe enhanced or determined by detecting the player's rate of a standing jog or arm swing rate of the football.

Sense players side to side shifting motion as an indication of running direction change and/or dodge tacklers.

Sense players upward motion as an indication to jump over tacklers.

Simulate animated play action on the display 104, showing tacklers approaching and striking or missing, and if appropriate, showing a goal line in first person perspective for the player to cross.

Exemplary Illustrative Non-Limiting Additional Input Controls

Figure 8A:
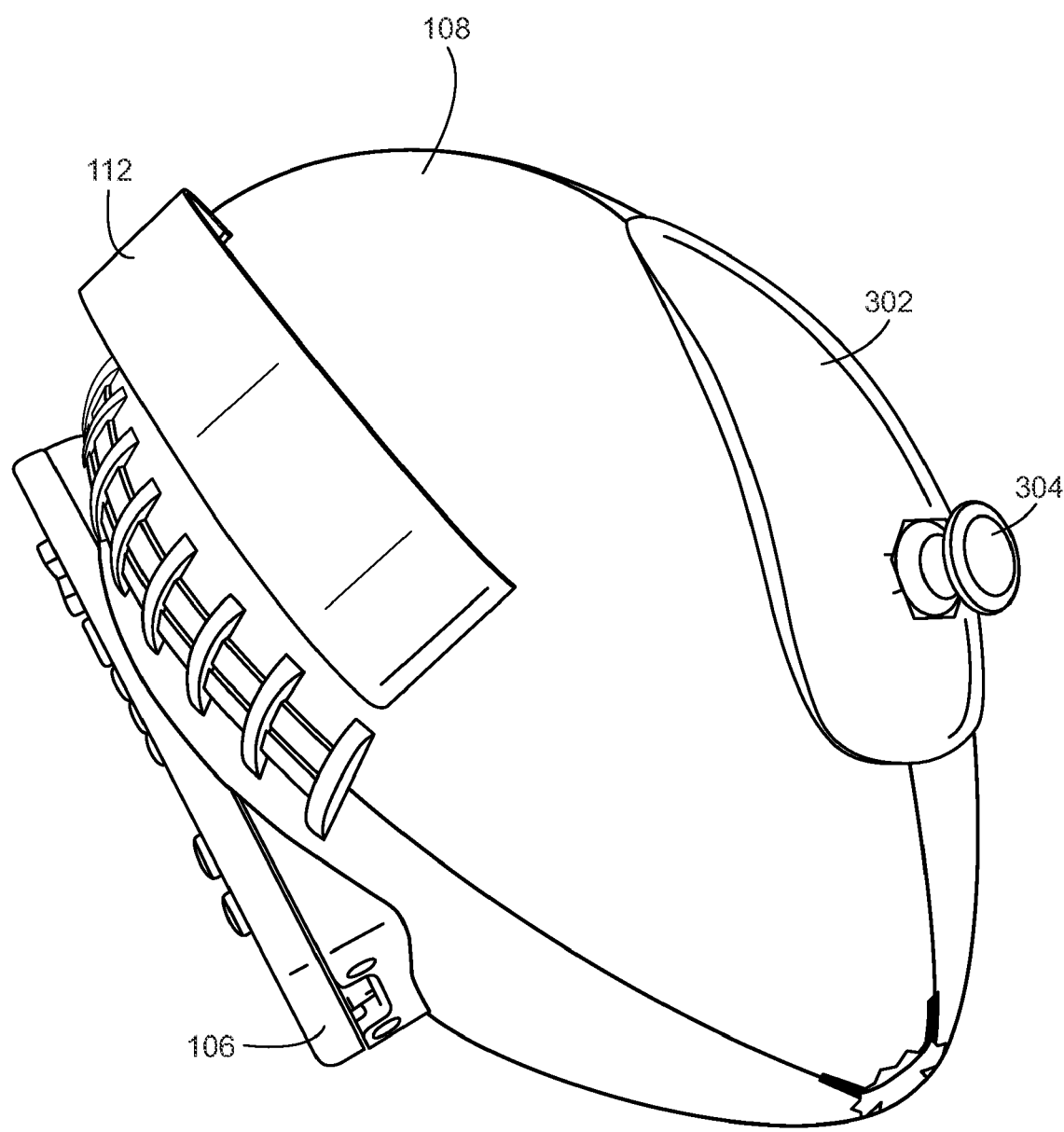
FIGS. 8A-8B show a further exemplary illustrative non-limiting football model implementation that accepts two handheld controller devices that can sense their own position, orientation and/or motion.
Figure 8B:
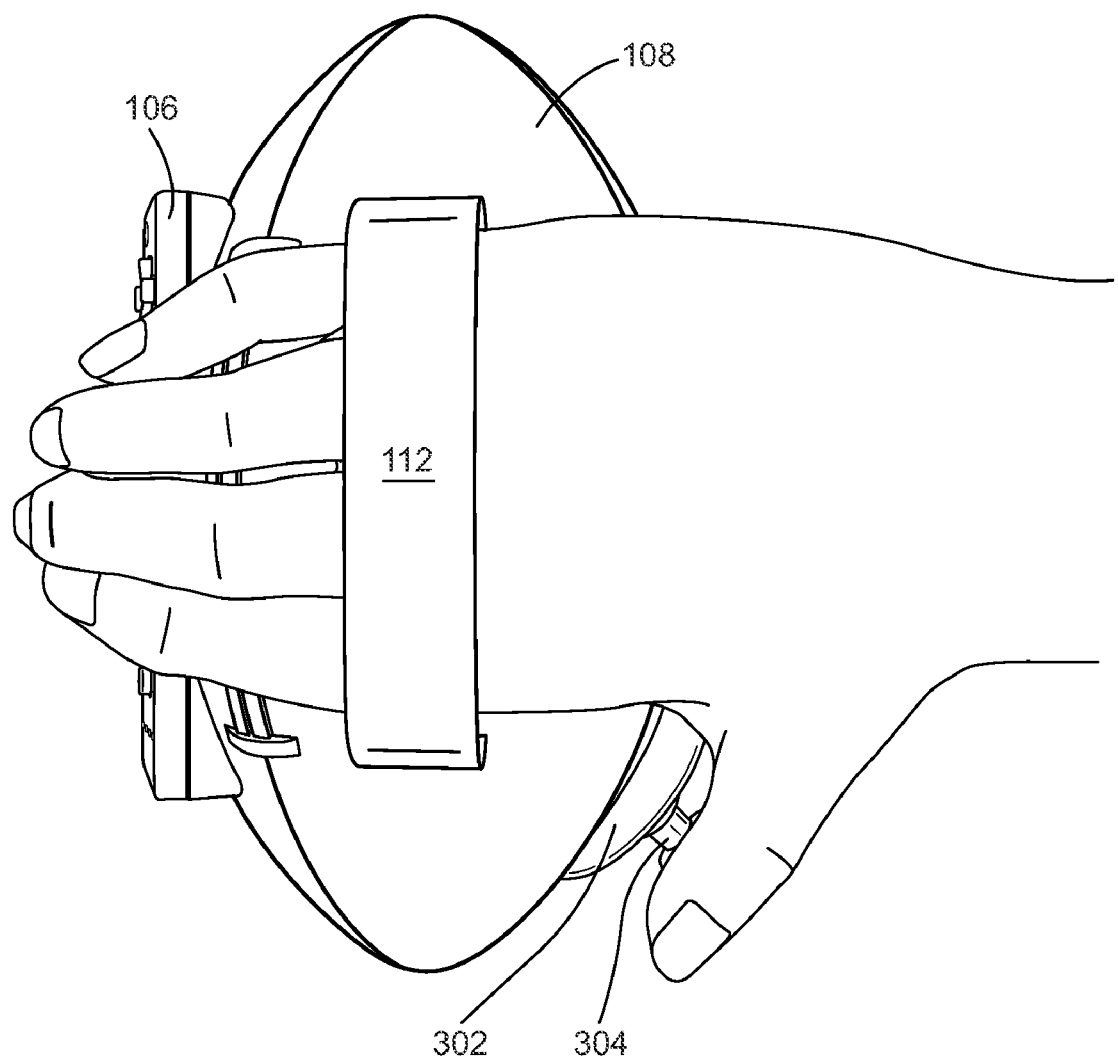

FIG. 8A shows a further implementation wherein the football 108 includes an additional depression dimensioned to accept and snugly retain a Wii Nunchuk 302 or other additional controller. The Nunchuk 302 includes a joystick 304 as well as an internal 3-axis accelerometer that can be used during throwing motion to indicate quarterback mobility, receive selection and route (see FIG. 8B). This additional accelerometer (for example, inside Nunchuk 302) can be added to pair with the Wii Remote accelerometer within controller 106 to assist in sensing orientation. This improves the ability to recognize the intended actions.

Figure 9A:
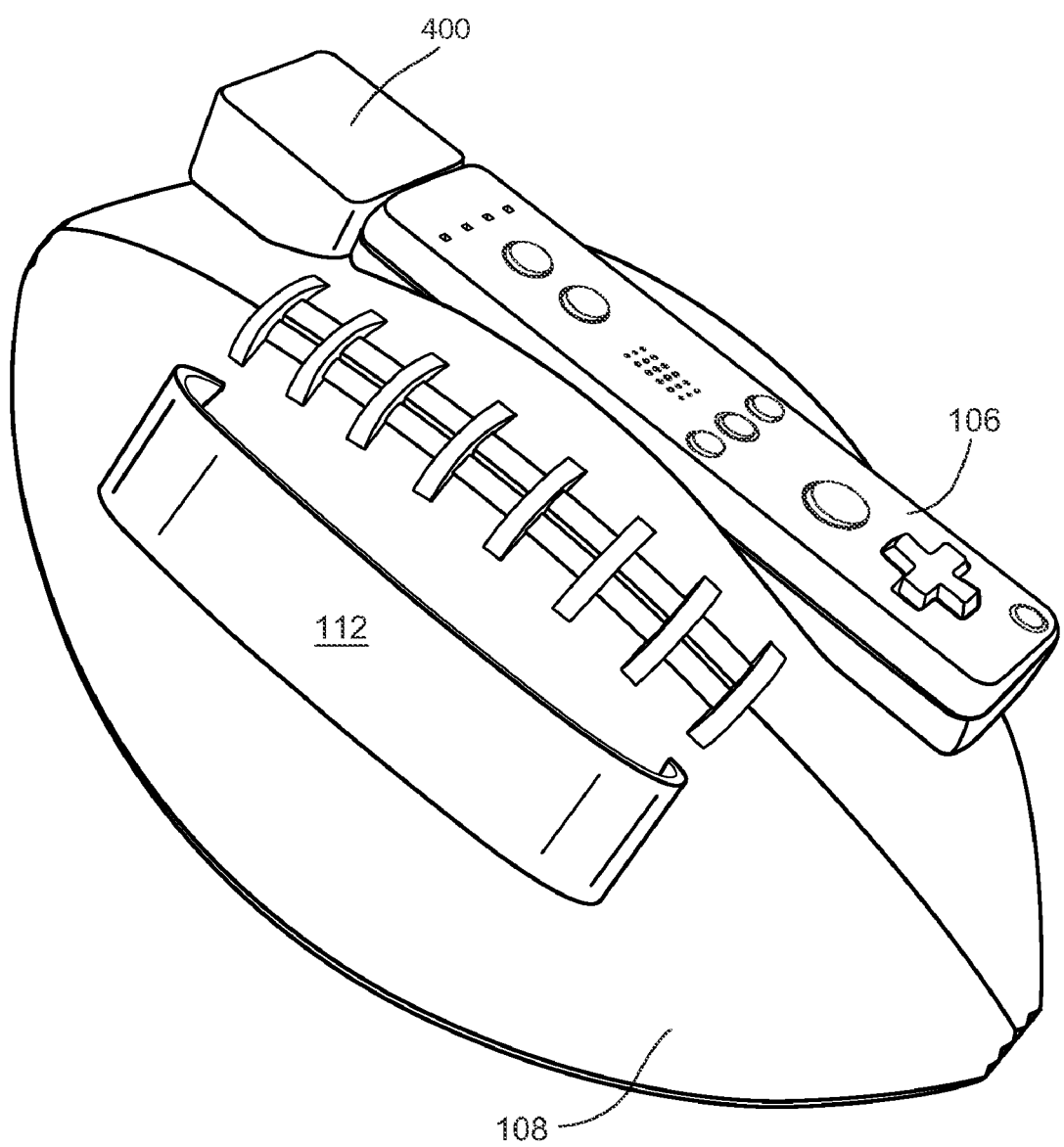
FIGS. 9A-9B show yet a further exemplary illustrative non-limiting football model implementation that accepts and snugly retains additional controller accessories.
Figure 9B:
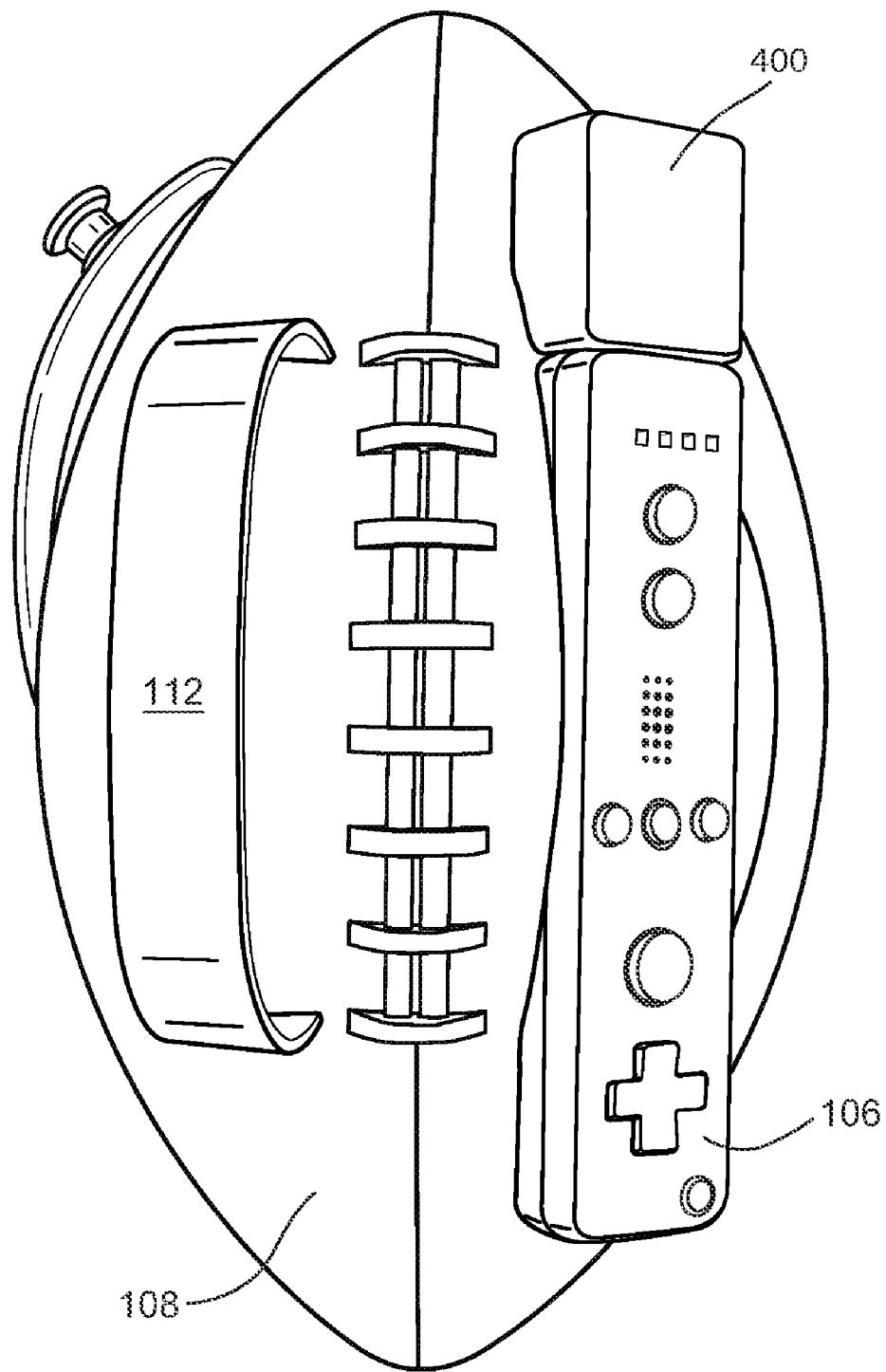

FIG. 9A shows a further implementation wherein a low cost gyroscope (MEMS type) attachment 400 is added to sense orientation and improve ability to recognize the intended actions. To use this implementation, a Wii Remote 106 inserted into the side of the football 108, a Nunchuk 302 is optionally inserted into the side of the football, and an I2C-attached gyroscope 400 inserted (built in) inside the foam football or attached to the controller 106 via its connector.

In some implementations, it may be desirable to require player 110 to train the system with example throws. For example, throwing left, right, far and near once or several times to train the game software on this players particular motion. The training data can then be used to more accurately detect a particular player's intended motion.

While the technology herein has been described in connection with exemplary illustrative non-limiting implementations, the invention is not to be limited by the disclosure. For example, while the exemplary illustrative non-limiting implementation has been described in connection with a football game, other games or activities are possible including for example soccer, rugby, basketball, or any other sports game or other activity that uses a ball, other projectile, or any other object that can be carried and/or thrown. While the exemplary implementations all involve removable inserting a handheld controller(s) into a model of a ball, other implementations could include various sensors (e.g., accelerometers and/or gyroscopes) and controls built into the ball model. The invention is intended to be defined by the claims and to cover all corresponding and equivalent arrangements whether or not specifically disclosed herein.

We claim:

1. A video game play system comprising:
an object shaped as a football-shaped projectile, said object comprising a prolate spheroid body, laces and a retaining strap structured to capture and retain a player's hand in contact with the prolate spheroid body, said object including a depression therein for snugly accepting and retaining a normally handheld controller that can sense aspects of its own position, orientation and/or motion; and
a video game unit communicating with said controller, said video game unit producing a display that at least in part reflects or responds to simulated throwing or carrying of said football-shaped projectile,
wherein said football-shaped projectile retaining strap permits the player to simulate throwing of said projectile without the projectile leaving the player's captured and retained hand.

2. The system of claim 1 wherein said projectile is shaped like an American football having pointed ends.

3. The system of claim 1 wherein said controller includes a three-axis accelerometer that is used to sense motion of the projectile.

4. The system of claim 1 wherein the controller communicates wirelessly with the video game unit.

5. A video game accessory comprising:
a body shaped like an American football comprising an egg-shaped body with pointed ends, said body having simulated or actual laces, said body defining a depression therein, said depression being dimensioned to accept and snugly retain a normally handheld controller that can sense aspects of its own position, orientation and/or motion; and
a hand retaining structure coupled to said body that captures and retains a player's hand to permit the body to be thrown in a simulated way without the body leaving the player's hand.

6. A method of simulating a football game comprising:

using an accelerometer to sense motion of a football-shaped body comprising an egg-shape having laces and including a hand-trapping strap;

in response to outputs generated by said accelerometer, determining whether the football-shaped body has been thrown in a simulated pass without the football-shaped body leaving a player's hand captured in the hand-trapping strap; and conditioned on said determining, displaying a wide receiver that selectively receives a virtual football.

* * * * *